United States Patent
Crosier

(10) Patent No.: US 10,430,159 B1
(45) Date of Patent: Oct. 1, 2019

(54) GAS DISCHARGE TUBE TRUE RANDOM NUMBER GENERATOR

(71) Applicant: HONEYWELL FEDERAL MANUFACTURING & TECHNOLOGIES, LLC, Kansas City, MO (US)

(72) Inventor: Lawrence Christopher Crosier, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 94 days.

(21) Appl. No.: 15/652,496

(22) Filed: Jul. 18, 2017

(51) Int. Cl.
*G06F 7/58* (2006.01)
*G05F 1/618* (2006.01)

(52) U.S. Cl.
CPC ............. *G06F 7/588* (2013.01); *G05F 1/618* (2013.01)

(58) Field of Classification Search
None
See application file for complete search history.

(56) References Cited

U.S. PATENT DOCUMENTS

| | | | |
|---|---|---|---|
| 3,423,683 A | 1/1969 | Kelsey | |
| 4,810,975 A * | 3/1989 | Dias | G06F 7/588 331/111 |
| 6,919,579 B2 | 6/2005 | Amin et al. | |
| 7,930,333 B2 | 4/2011 | Vartsky et al. | |
| 8,039,890 B2 | 10/2011 | Matsumoto et al. | |
| 8,615,034 B2 * | 12/2013 | Kitagaki | H04N 5/357 375/224 |
| 2003/0018674 A1 | 1/2003 | Figotin | |
| 2003/0131031 A1 | 7/2003 | Klass | |

OTHER PUBLICATIONS

Glover, John Sigsworth (1995) The hardware implementation of an artificial neural network using stochastic pulse rate encoding principles, Durham theses, Durham University. http://etheses.dur.ac.uk/5423/.

Calude, Cristian S. (2004) Algorithmic Randomness, Quantum Physics, and Incompleteness, Department of Computer Science, University of Auckland, New Zealand.

* cited by examiner

*Primary Examiner* — Michael D. Yaary
(74) *Attorney, Agent, or Firm* — Hovey Williams LLP

(57) ABSTRACT

A hardware random number generator comprises a gas discharge tube, an average voltage generator, and a comparator. The gas discharge tube includes first, second, and third terminals and may generate a variable voltage on the second terminal when a supply voltage is applied to the first and third terminals. The average voltage generator receives the variable voltage from the gas discharge tube and may generate an average voltage equal to a moving average value of the variable voltage over successive periods of time. The comparator receives the variable voltage and the average voltage and may generate a random stream of data bits, such that a value of each bit varies according to the relative magnitudes of the variable voltage and the average voltage.

20 Claims, 3 Drawing Sheets

GAS DISCHARGE TUBE TRUE RANDOM NUMBER GENERATOR

STATEMENT REGARDING FEDERALLY-SPONSORED RESEARCH OR DEVELOPMENT

This invention was made with government support under Contract No.: DE-NA0002839 awarded by the Department of Energy. The government has certain rights in the invention.

BACKGROUND OF THE INVENTION

Field of the Invention

Embodiments of the current invention relate to hardware type true random number generators.

Description of the Related Art

True random number generators, also known as hardware random number generators, typically utilize naturally occurring phenomena to generate random numbers that do not follow a pattern. The phenomena may include quantum events, such as shot noise created by light shining on a photodiode, nuclear decay measured by a Geiger counter, etc., or thermal energy effects, such as thermal noise from a resistor, avalanche noise from an avalanche diode, atmospheric noise detected by a radio receiver, and so forth. The events or effects may be converted to an electronic signal by a sensor or detector, and the electronic signal may be converted to a stream of numbers which are random. Some drawbacks to these implementations include the requirement of additional electronic circuitry such as antennas and signal amplifiers, high power consumption, access to radioactive materials, and so forth. But perhaps the biggest drawback is that the above-discussed phenomena are typically low frequency events or effects—particularly when generating large magnitude numbers. Thus, there is not a sufficient amount of random numbers produced per second. Accordingly, these random number generators may not be suitable for applications, such as 128-bit or 256-bit data encryption keys, numerical simulation or analysis including Monte Carlo and neural networks, randomizers for video games, virtual reality, gambling including card and dice games, slot and electronic gambling machines, commercial or public lotteries, and so on, which require high bandwidth/frequency, large magnitude numbers, or both.

SUMMARY OF THE INVENTION

Embodiments of the current invention solve the above-mentioned problems and provide a distinct advance in the art of true random number generation. One embodiment of the invention provides a hardware random number generator comprising a gas discharge tube, an average voltage generator, and a comparator. The gas discharge tube includes first, second, and third terminals and may generate a variable voltage on the second terminal when a supply voltage is applied to the first and third terminals. The average voltage generator receives the variable voltage from the gas discharge tube and may generate an average voltage equal to a moving average value of the variable voltage over successive periods of time. The comparator receives the variable voltage and the average voltage and may generate a random stream of data bits, such that a value of each bit varies according to the relative magnitudes of the variable voltage and the average voltage.

Another embodiment of the invention provides a hardware random number generator comprising a first gas discharge tube, a second gas discharge tube, and a comparator. The first gas discharge tube includes first, second, and third terminals and may generate a first variable voltage on the second terminal when a supply voltage is applied to the first and third terminals. Like the first gas discharge tube, the second gas discharge tube includes first, second, and third terminals and may generate a second variable voltage on the second terminal when a supply voltage is applied to the first and third terminals. The comparator receives the first variable voltage and the second variable voltage and may generate a random stream of data bits, such that a value of each bit varies according to the relative magnitudes of the first variable voltage and the second variable voltage.

Yet another embodiment of the invention provides a hardware random number generator comprising a gas discharge tube, a low pass filter, an analog to digital converter, and a processing element. The gas discharge tube includes first, second, and third terminals and may generate a variable voltage on the second terminal when a supply voltage is applied to the first and third terminals. The low pass filter receives the variable voltage and may attenuate any frequency components of the variable voltage that are greater than a cutoff frequency to generate a filtered variable voltage. The analog to digital converter receives the filtered variable voltage and may sample the filtered variable voltage to generate a stream of binary number samples. The processing element receives the stream of binary number samples and may calculate a moving average of a predetermined number of binary number samples, compare a current binary number sample with the moving average, and generate a random stream of data bits, such that a value of each bit varies according to the relative magnitudes of the current binary number sample and the moving average.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
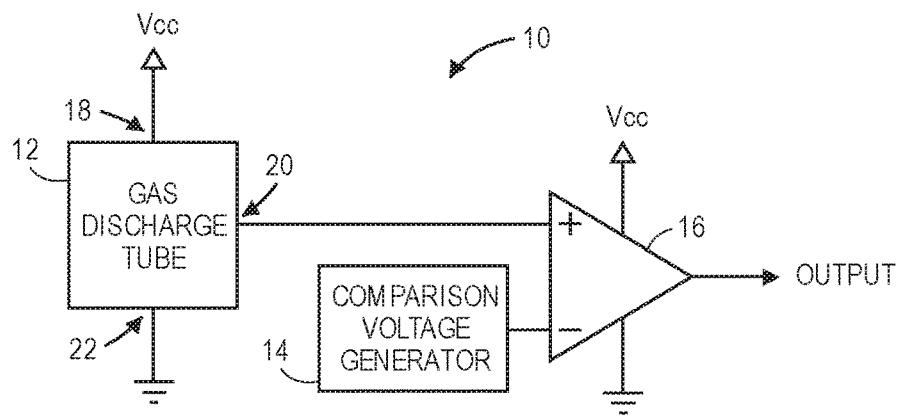
FIG. 1 is a schematic block diagram of a hardware random number generator, constructed in accordance with a first embodiment of the current invention, the hardware random number generator comprising a gas discharge tube, a comparison voltage generator, and a comparator.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A hardware random number generator 10, constructed in accordance with various embodiments of the current invention, is shown in FIG. 1 and broadly comprises a gas discharge tube 12, a comparison voltage generator 14, and a comparator 16.

The gas discharge tube 12 generally provides a variable output voltage. Exemplary gas discharge tubes 12 may include a housing of hollow cylindrical, rectangular box, or similar shape with an internal chamber filled with a gas or gas mixture. The housing may be formed from glass, ceramics, polymers, or other electrically insulating and mechanically rigid materials. The gas may include mercury, argon, tritium, or the like, or mixtures thereof. The gas discharge tube 12 may further include a first terminal 18, a second terminal 20, and a third terminal 22, each formed from electrically conductive material, such as metals or metal alloys. The first terminal 18 may electrically contact, or be exposed to, the gas chamber at a first end thereof. The third terminal 22 may electrically contact, or be exposed to, the gas chamber at a second end thereof, opposing the first end. The second terminal 20 may electrically contact, or be exposed to, the gas chamber at a location approximately midway between the first terminal 18 and the third terminal 22, or midway along a length of the chamber.

An exemplary gas discharge tube 12 may operate as follows. When an electric voltage is applied to the first and third terminals 18, 22, the gas retained within the chamber may be energized to the point that at least a portion of the gas is ionized producing a voltage at the second terminal 20 which may vary continuously at a high frequency and in a random fashion. The voltage at the second terminal 20 may vary randomly, but over time, may have an average value that is related to a position at which the second terminal 20 makes electrical contact with the chamber of gas. Since the second terminal 20 electrically contacts the gas in the chamber approximately midway along the length of the chamber, the average voltage at the second terminal 20 is approximately half the voltage applied to the first and second terminals 18, 22.

The voltage applied to the first and third terminals 18, 22 may include standard direct current (DC) logic voltage levels, such as 5 Volts (V), 3.3 V, etc., wherein the first terminal 18 is electrically connected to a DC voltage source Vcc, such as a power supply, a voltage regulator, a battery, or the like, and the third terminal 22 is electrically connected to electrical ground. Thus, the voltage at the second terminal 20 may vary randomly, but may have an average value of 2.5 V, 1.65 V, etc.

The comparison voltage generator 14 generally provides a comparison voltage with which the voltage of the second terminal 20 is compared. The comparison voltage generator 14 may be implemented in one of a plurality of embodiments. One embodiment, shown in FIG. 2, may include a first resistor, a second resistor, and an opamp. The first and second resistors may form a voltage divider network that is electrically connected between the DC voltage supply and electrical ground. Typically, the first and second resistors have approximately the same resistance value, thereby providing a voltage equal to approximately half the DC voltage source value. The opamp may include a positive terminal, a negative terminal, and an output. The positive terminal may be electrically connected to the terminals where the first resistor is electrically connected to the second resistor. The negative terminal may be electrically connected to the output, thus forming a unity-gain amplifier of the voltage at the positive terminal. Therefore, the output of the comparison voltage generator 14 is Vcc/2.

Figure 2:
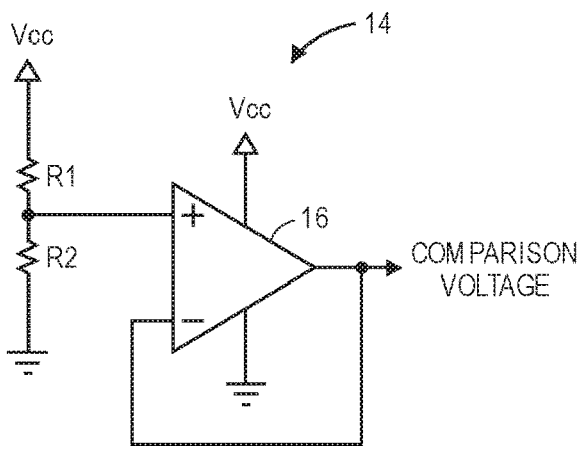
FIG. 2 is a schematic block diagram of a first embodiment of the comparison voltage generator.
Figure 3:
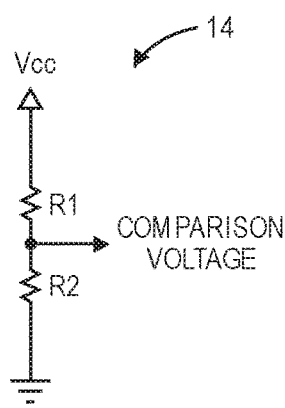
FIG. 3 is a schematic block diagram of a second embodiment of the comparison voltage generator.

Another embodiment of the comparison voltage generator 14, shown in FIG. 3, may include just the first resistor and the second resistor from the circuit of FIG. 2. The output of the comparison voltage generator 14 is again Vcc/2.

Figure 4:
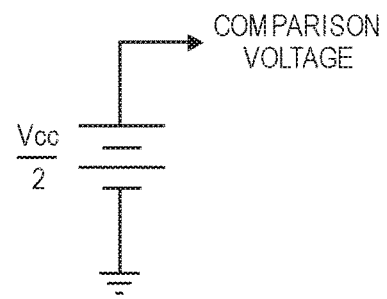
FIG. 4 is a schematic block diagram of a third embodiment of the comparison voltage generator.

Yet another embodiment of the comparison voltage generator 14, shown in FIG. 4, may include a DC voltage source, such as a battery or a DC power supply. In order to achieve the proper comparison voltage, the voltage level of the DC voltage source may be set to Vcc/2.

The comparator 16 generally compares two input voltages and generates an output voltage whose value varies according to, or is determined by, which of the two input voltages is larger. The comparator 16 may be embodied by an opamp which includes a positive terminal, a negative terminal, a positive supply terminal, a negative supply terminal, and an output. The positive terminal may be electrically connected to the second terminal 20 of the gas discharge tube 12. The negative terminal may be electrically connected to the output of the comparison voltage generator 14. The positive supply terminal may be electrically connected to the DC voltage source Vcc, or it may be connected to a different voltage source. The negative supply terminal may be electrically connected to electrical ground. The opamp may amplify a voltage difference between the voltages at the positive and negative terminals. Given this behavior and the electrical connections of the positive and negative supplies, the output generally swings to the positive voltage rail, or the voltage level of the DC voltage source Vcc, when the voltage at the positive terminal is greater and swings to the negative voltage rail, or electrical ground, when the voltage at the negative terminal is greater. When the two voltages are equal, the output could swing one way or the other, either to the positive voltage rail or to the negative voltage rail.

The hardware random number generator 10 may operate as follows. The gas discharge tube 12 may produce or generate a randomly variable voltage at the second terminal 20 which has an average value over time of approximately half the voltage applied to the first and third terminals 18, 22, or approximately Vcc/2. The variable voltage is received by the positive terminal of the comparator 16. The negative terminal of the comparator 16 receives the comparison voltage from the comparison voltage generator 14. The comparison voltage typically has a value of Vcc/2. The comparator 16 compares the variable voltage with the comparison voltage. If the variable voltage is greater than the comparison voltage, then the output voltage level of the comparator 16 may be approximately Vcc, or a "high" voltage, or a binary "1". If the comparison voltage is greater than the variable voltage, then the output voltage level of the comparator 16 may be approximately electrical ground, or a "low" voltage, or a binary "0". If the comparison voltage is equal to the variable voltage, then the output voltage level of the comparator 16 may be either 1 or 0. Thus, the comparator 16 and the hardware random number generator 10 generate a random data bit stream of 1s and 0s, the value of which varies according to, or is determined by, the relative magnitudes of the variable voltage and the comparison voltage.

Figure 5:
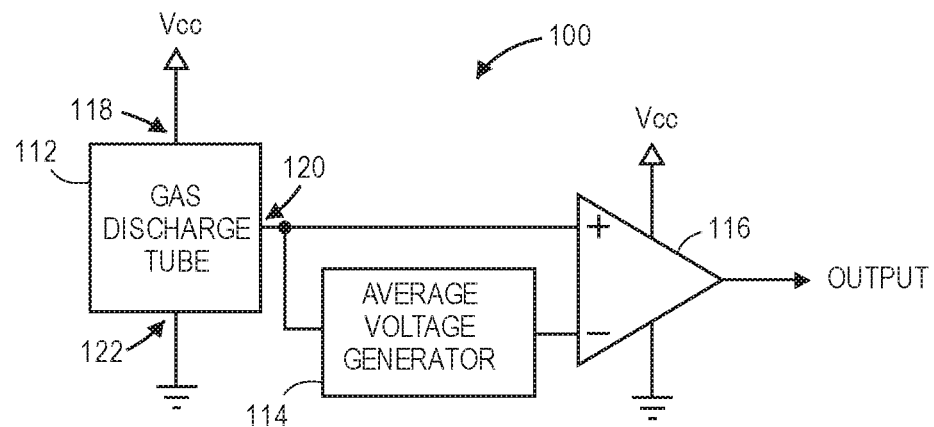
FIG. 5 is a schematic block diagram of a second embodiment of the hardware random number generator comprising a gas discharge tube, an average voltage generator, and a comparator.

Another embodiment of the hardware random number generator 100 is shown in FIG. 5 and may broadly comprise a gas discharge tube 112, an average voltage generator 114, and a comparator 116. The gas discharge tube 112 may be substantially similar in structure and function to the gas discharge tube 12 and may include a first terminal 118, a second terminal 120, and a third terminal 122, all substantially similar to the like-named components discussed above. Furthermore, the first terminal 118 may be electrically connected to the DC voltage source Vcc, and the third terminal 122 may be electrically connected to electrical ground.

The average voltage generator 114 may generate an output voltage that is a moving average (statistical mean) of an input voltage over sequential periods of time. The average voltage generator circuit may be utilized to compensate for process or manufacturing variations in the gas discharge tube 112 that would cause the average value of the second terminal 120 of the gas discharge tube 112 to drift to be greater than or less than expected—in this case, half the value of the voltage applied to the first and third terminals 118, 122.

The average voltage generator 114 may include analog discrete passive and/or active electronic components forming a circuit that receives a continuous time voltage waveform and continuously generates an output voltage waveform that is the moving average of the input waveform for the just-elapsed sequential periods of time in terms of nanoseconds, microseconds, milliseconds, etc. The period of time during which the input voltage waveform is averaged may vary according to, or be determined by, the circuit architecture and the values of passive components, such as resistors and capacitors, which determine a time constant. The input voltage waveform is received from the second terminal 120 of the gas discharge tube 112. The average voltage generator 114 may output an average voltage which is the moving average value of the voltage of the second terminal 120.

The comparator 116 may be substantially similar to the comparator 16 in structure and function. The positive terminal may be electrically connected to the second terminal 120 of the gas discharge tube 112, while the negative terminal may be electrically connected to the output of the average voltage generator 114.

The hardware random number generator 100 may operate as follows. The gas discharge tube 112 may produce or generate a randomly variable voltage at the second terminal 120 which has an average value over time of approximately half the voltage applied to the first and third terminals 118, 122, or approximately Vcc/2. The variable voltage is received by the positive terminal of the comparator 116. The negative terminal of the comparator 116 receives the average voltage from the average voltage generator 114. The average voltage may have a value which is the moving average value of the voltage of the second terminal 120. The comparator 116 compares the variable voltage with the average voltage. If the variable voltage is greater than the average voltage, then the output voltage level of the comparator 116 may be approximately Vcc, or a "high" voltage, or a binary "1". If the average voltage is greater than the variable voltage, then the output voltage level of the comparator 116 may be approximately electrical ground, or a "low" voltage, or a binary "0". If the average voltage is equal to the variable voltage, then the output voltage level of the comparator 116 may be either 1 or 0. Thus, the comparator 116 and the hardware random number generator 100 generate a random data bit stream of 1s and 0s, the value of which varies according to, or is determined by, the relative magnitudes of the variable voltage and the average voltage.

Figure 6:
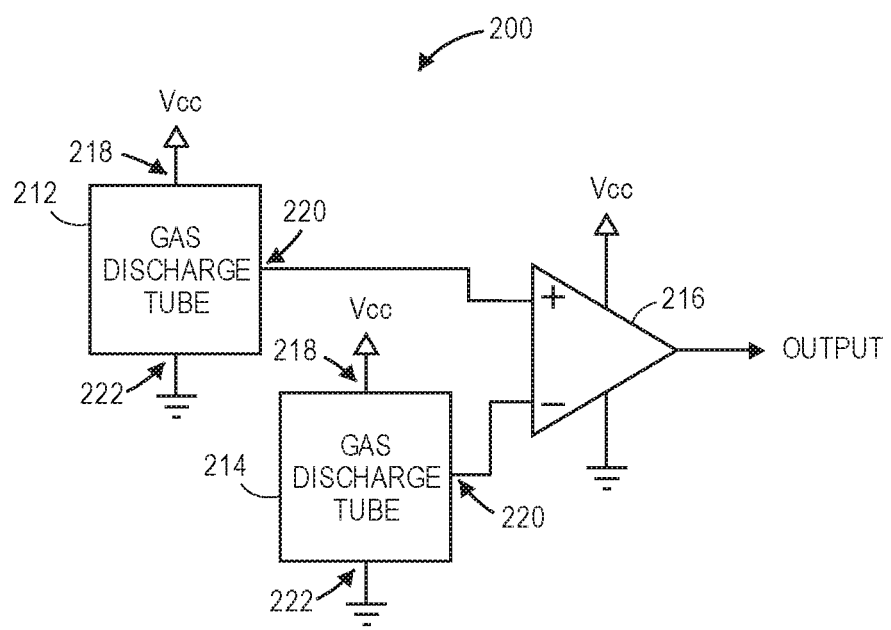
FIG. 6 is a schematic block diagram of a third embodiment of the hardware random number generator comprising a first gas discharge tube, a second gas discharge tube, and a comparator.

Another embodiment of the hardware random number generator 200 is shown in FIG. 6 and may broadly comprise a first gas discharge tube 212, a second gas discharge tube 214, and a comparator 216. The first and second discharge tubes 212, 214 may be substantially similar in structure and function to the gas discharge tube 12, and each gas discharge tube 212, 214 may include a first terminal 218, a second terminal 220, and a third terminal 222, all substantially similar to the like-named components discussed above. The first terminal 218 of each gas discharge tube 212, 214 may be electrically connected to a DC voltage source Vcc, while the third terminal of each gas discharge tube 212, 214 may be electrically connected to electrical ground.

The comparator 216 may be substantially similar to the comparator 16 in structure and function. The positive terminal may be electrically connected to the second terminal 220 of the first gas discharge tube 212, while the negative terminal may be electrically connected to the second terminal 220 of the second gas discharge tube 214.

The hardware random number generator 200 may operate as follows. Each gas discharge tube 212, 214 may produce or generate a randomly variable voltage at its second terminal 220 which has an average value over time of approximately half the voltage applied to the first and third terminals 218, 222, or approximately Vcc/2. The variable voltage from the first gas discharge tube 212 is received by the positive terminal of the comparator 216, while the variable voltage from the second gas discharge tube 214 is received by the negative terminal of the comparator 216. The comparator 216 compares the first variable voltage with the second variable voltage. If the first variable voltage is greater than the second variable voltage, then the output voltage level of the comparator 216 may be approximately Vcc, or a "high" voltage, or a binary "1". If the second variable voltage is greater than the first variable voltage, then the output voltage level of the comparator 216 may be approximately electrical ground, or a "low" voltage, or a binary "0". If the first variable voltage is equal to the second variable voltage, then the output voltage level of the comparator 216 may be either 1 or 0. Thus, the comparator 216 and the hardware random number generator 200 generate a random data bit stream of 1s and 0s, the value of which varies according to, or is determined by, the relative magnitudes of the variable voltage and the average voltage.

Figure 7:
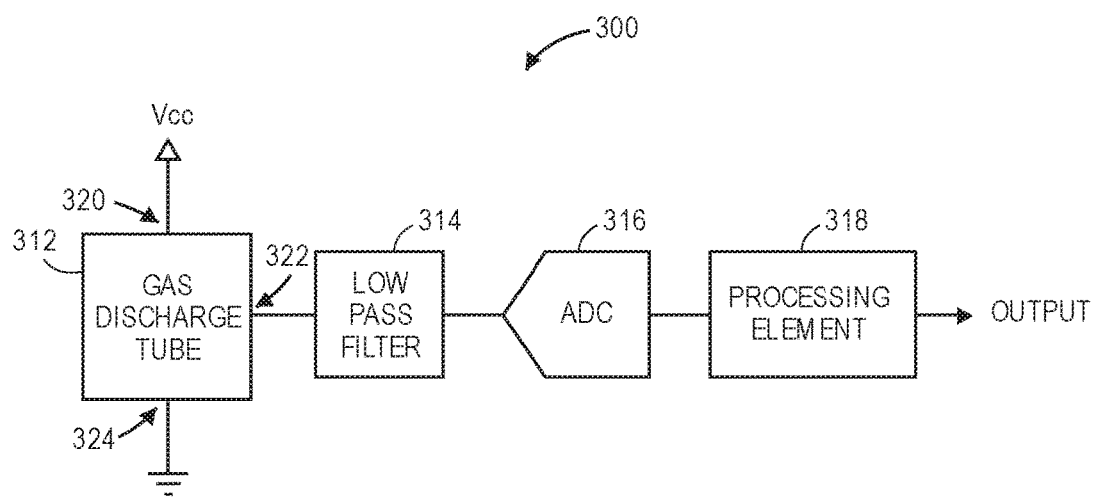
FIG. 7 is a schematic block diagram of a fourth embodiment of the hardware random number generator comprising a gas discharge tube, a low pass filter, an analog to digital converter, and a processing element.

Another embodiment of the hardware random number generator 300 is shown in FIG. 7 and may broadly comprise a gas discharge tube 312, a low pass filter 314, an analog to digital converter (ADC) 316, and a processing element 318. The gas discharge tube 312 including first, second, and third terminals 320, 322, 324, may be substantially similar to the like-named components described above. Furthermore as seen in FIG. 7, the first terminal 320 may be electrically connected to a DC voltage source Vcc. And, the third terminal 324 may be electrically connected to electric ground.

The low pass filter 314 generally attenuates amplitudes of frequency components of an input electric signal or waveform that exceed a cutoff frequency. The low pass filter 314 may be formed from discrete passive and/or active electronic components. The cutoff frequency may vary according to, or be determined by, a sampling frequency of the ADC 316 discussed below. Typically, in order to satisfy the Nyquist criterion, the cutoff frequency is approximately half the sampling frequency. The low pass filter 314 may include an input electrically connected to the second terminal 322 of the gas discharge tube 312, which generates the variable voltage. The low pass filter 314 may include an output which produces the variable voltage from the second terminal 322 with the amplitudes of frequency components that exceed the cutoff frequency being attenuated.

The ADC 316 generally converts an analog voltage signal or waveform to a digital binary data stream. The ADC 316 may be implemented using configurations such as direct conversion, successive approximation, ramp compare, Wilkinson, integration, delta encoded, etc. The ADC 316 may include an input which is electrically connected to the output of the low pass filter 314 and receives the filtered output of the second terminal 322 of the gas discharge tube 312. The ADC 316 may sample the filtered output at a sampling frequency producing a stream of sampled values, convert the stream of sampled values to a stream of binary number samples, and generate an output which is the stream of binary number samples either in parallel or serial form.

The processing element 318 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 318 may generally execute, process, or run instructions, code, code segments, software, firmware, programs, applications, apps, processes, services, daemons, or the like. The processing element 318 may also include hardware components such as finite-state machines, sequential and combinational logic, and other electronic circuits that can perform the functions necessary for the operation of the current invention. Furthermore, the processing element 318 may include, or be in communication with, a memory element capable of storing digital binary data.

The processing element 318 may electrically connected to the ADC 316 and may receive the stream of binary number samples. By utilizing hardware, software, firmware, or combinations thereof, the processing element 318 may be configured or programmed to calculate an average (statistical mean) of a predetermined, but adjustable, number of samples in a moving window fashion. For example, the processing element 318 may calculate a moving average of ten, a hundred, a thousand, etc., samples. To implement the moving window, in the case of averaging ten samples, the processing element 318 may calculate the average for sample numbers 1-10, followed by sample numbers 2-11, followed by sample numbers 3-12, and so forth. Thus, the average is updated for each sample. In addition, the processing element 318 may compare the value of the current sample to the value of the average. If the value of the current sample is greater than the value of the average, then the processing element 318 may generate a binary "1". If the value of the current sample is less than or equal to the value of the average, then the processing element 318 may generate a binary "0". It is within the scope of the current invention for these outcomes to be reversed. The processing element 318 may output a serial stream of random binary data bits (i.e., 0s and 1s). Alternatively, the processing element 318 may store the stream of data and output numbers in multi-bit form, such as 8-bit, 16-bit, 32-bit, 64-bit, etc., numbers.

The hardware random number generator 300 may operate as follows. The gas discharge tube 312 may produce or generate a randomly variable voltage at the second terminal 322 which has an average value over time of approximately half the voltage applied to the first and third terminals 320, 322, or approximately Vcc/2. The variable voltage is received by the low pass filter 314 which filters out any frequency components greater than the cutoff frequency. The ADC 316 receives the filtered variable voltage from the low pass filter 314 and samples the filtered variable voltage and generates a stream of binary number samples. The processing element 318 receives the stream of binary number samples and calculates a moving average of a predetermined number, or amount, of samples. The processing element 318 may then compare the value of the current sample to the value of the moving average. As described above, the processing element 318 may generate a binary 1 or a binary 0 which varies according to the relative magnitudes of the current sample and the moving average. The hardware random number generator 300 may generate a serial stream of data bits or numbers such as 8-bit, 16-bit, 32-bit, 64-bit, etc., numbers.

The output of any of the hardware random number generators 10, 100, 200, 300 may be directly accessed or sampled for usage in applications such as data encryption, numerical simulation or analysis, video games, virtual reality, gambling, and the like, or may be used as a seed for pseudo random number generators. Alternatively, the output of the hardware random number generators 10, 100, 200, 300 may be further conditioned to remove or reduce bias or increase randomness by utilizing a von Neumann method or similar approach.

In general, as discussed above, true randomness of the generated numbers is preferred. However, in some situations, such as casino-based gaming, it may be desired to control the degree of randomness of the generated numbers so that the numbers have a bias. With the hardware random number generator 10, this control may be accomplished by adjusting the output of the comparison voltage generator 14 to be either greater than or less than Vcc/2. With the hardware random number generator 100, this control may be accomplished by adding a DC voltage level shift to the average voltage generator 114 to adjust the output thereof to be either greater than or less than the average voltage of the gas discharge tube 112. With the hardware random number generator 300, this control may be accomplished by adjusting the hardware, software, or firmware of the processing element 318 to add a fixed value to or subtract a fixed value from the moving average of binary number samples from the gas discharge tube 312. The process described above continues with the adjusted moving average then being compared to the current sample.

Figure 8A:
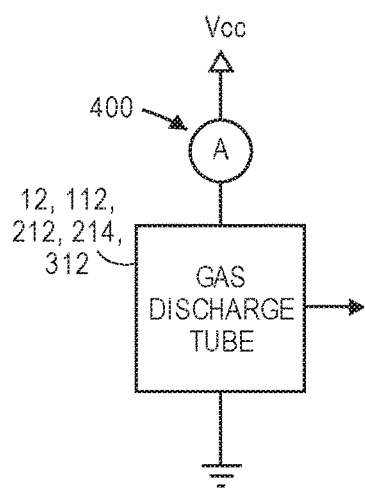
FIG. 8A is a schematic block diagram of a first embodiment of a component configured to detect tampering with the hardware random number generator.
Figure 8B:
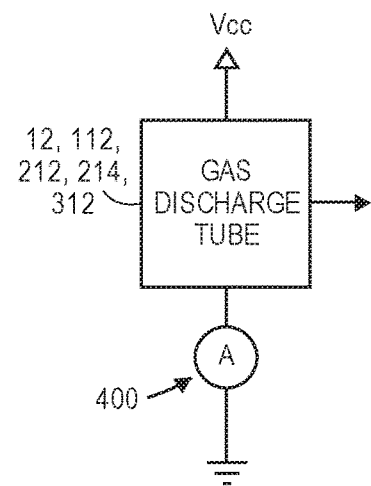
FIG. 8B is a schematic block diagram of a second embodiment of the component configured to detect tampering with the hardware random number generator.

An optional component that may be utilized, or integrated with, any of the gas discharge tubes 12, 112, 212, 214, 312 is shown in FIGS. 8A and 8B. An ammeter 400, or electric current meter, may be electrically connected in series with the DC voltage supply Vcc in order to measure power supply current. In FIG. 8A, the ammeter 400 may be electrically connected between the first terminal of the gas discharge tube 12, 112, 212, 214, 312 and the DC voltage supply. In FIG. 8B, the ammeter 400 may be electrically connected between the third terminal of the gas discharge tube 12, 112, 212, 214, 312 and electrical ground. The current measurement generated by the ammeter 400 may be monitored by a processor, such as the processing element 318, to determine imminent failure of, or tampering with, the gas discharge tube 12, 112, 212, 214, 312. Normal aging of the gas discharge tube 12, 112, 212, 214, 312 results in a slow decrease of the power supply current. A sudden decrease in the electric current from the power supply, caused by tampering or imminent failure, could generate an alert from the processor.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A hardware random number generator comprising:
   a gas discharge tube including three terminals, the gas discharge tube configured to generate a variable voltage on one of the terminals when a supply voltage is applied to the other two terminals;
   an average voltage generator receiving the variable voltage from the gas discharge tube, the average voltage generator configured to generate an average voltage equal to a moving average value of the variable voltage over successive periods of time; and
   a comparator receiving the variable voltage and the average voltage, the comparator configured to generate a random stream of data bits, such that a value of each bit varies according to the relative magnitudes of the variable voltage and the average voltage.

2. The hardware random number generator of claim 1, wherein the comparator is configured to generate the data bit with a first binary level when the variable voltage is greater than the average voltage.

3. The hardware random number generator of claim 2, wherein the comparator is configured to generate the data bit with a second binary level when the average voltage is greater than the variable voltage.

4. The hardware random number generator of claim 3, wherein the comparator is configured to generate the data bit with the first binary level or the second binary level when the average voltage is equal to the variable voltage.

5. The hardware random number generator of claim 1, wherein one of the terminals is electrically connected to a DC voltage source and one of the terminals is electrically connected to electrical ground.

6. The hardware random number generator of claim 1, wherein the variable voltage of one of the terminals has an average value of approximately half a value of the supply voltage.

7. The hardware random number generator of claim 1, wherein the gas discharge tube includes
   an internal chamber filled with a gas or a gas mixture,
   a first terminal in electrical contact with a first end of the chamber,
   a second terminal in electrical contact with the chamber at a location approximately midway along a length of the chamber, and
   a third terminal in electrical contact with a second end of the chamber, opposite the first end.

8. A hardware random number generator comprising:
   a first gas discharge tube including first, second, and third terminals, the first gas discharge tube configured to generate a first variable voltage on the second terminal when a supply voltage is applied to the first and third terminals;
   a second gas discharge tube including first, second, and third terminals, the second gas discharge tube configured to generate a second variable voltage on the second terminal when the supply voltage is applied to the first and third terminals; and
   a comparator receiving the first variable voltage and the second variable voltage, the comparator configured to generate a random stream of data bits, such that a value of each bit varies according to the relative magnitudes of the first variable voltage and the second variable voltage.

9. The hardware random number generator of claim 8, wherein the comparator is configured to generate the data bit with a first binary level when the variable voltage is greater than the average voltage.

10. The hardware random number generator of claim 9, wherein the comparator is configured to generate the data bit with a second binary level when the average voltage is greater than the variable voltage.

11. The hardware random number generator of claim 10, wherein the comparator is configured to generate the data bit with the first binary level or the second binary level when the average voltage is equal to the variable voltage.

12. The hardware random number generator of claim 8, wherein the first terminal of each gas discharge tube is electrically connected to a DC voltage source and the third terminal of each gas discharge tube is electrically connected to electrical ground.

13. The hardware random number generator of claim 8, wherein the variable voltage of the second terminal of each gas discharge tube has an average value of approximately half a value of the supply voltage.

14. The hardware random number generator of claim 8, wherein each of the first and second gas discharge tubes includes an internal chamber filled with a gas or a gas mixture, and
- the first terminal of each gas discharge tube is in electrical contact with a first end of its associated chamber,
- the second terminal of each gas discharge tube is in electrical contact with its associated chamber at a location approximately midway along a length of the chamber, and
- the third terminal of each gas discharge tube is in electrical contact with a second end of its associated chamber, opposite the first end.

15. A hardware random number generator comprising:
- a gas discharge tube including three terminals, the gas discharge tube configured to generate a variable voltage on one of the terminals when a supply voltage is applied to the other two terminals;
- a low pass filter receiving the variable voltage and configured to attenuate any frequency components of the variable voltage that are greater than a cutoff frequency to generate a filtered variable voltage;
- an analog to digital converter receiving the filtered variable voltage and configured to sample the filtered variable voltage to generate a stream of binary number samples; and
- a processing element receiving the stream of binary number samples and configured to
  - calculate a moving average of a predetermined number of binary number samples,
  - compare a current binary number sample with the moving average, and
  - generate a random stream of data bits, such that a value of each bit varies according to the relative magnitudes of the current binary number sample and the moving average.

16. The hardware random number generator of claim 15, wherein the processing element is further configured to generate the data bit with a first binary level when a value of the current binary number sample is greater than a value of the moving average.

17. The hardware random number generator of claim 16, wherein the processing element is further configured to generate the data bit with a second binary level when the value of the current binary number sample is less than or equal to the value of the moving average.

18. The hardware random number generator of claim 15, wherein one of the terminals is electrically connected to a DC voltage source and one of the terminals is electrically connected to electrical ground.

19. The hardware random number generator of claim 15, wherein the variable voltage of one of the terminals has an average value of approximately half of a value of the supply voltage.

20. The hardware random number generator of claim 15, wherein the gas discharge tube includes
- an internal chamber filled with a gas or a gas mixture,
- a first terminal in electrical contact with a first end of the chamber,
- a second terminal in electrical contact with the chamber at a location approximately midway along a length of the chamber, and
- a third terminal in electrical contact with a second end of the chamber, opposite the first end.

* * * * *